United States Patent
Zagroun et al.

(10) Patent No.: US 9,512,921 B2
(45) Date of Patent: Dec. 6, 2016

(54) GASKET FOR AN ELECTRICAL CONNECTION

(71) Applicant: Societe D'Exploitation Des Procedes Marechal, Saint-Maurice (FR)

(72) Inventors: Francis Zagroun, Neuilly sur Seine (FR); Johnny Dos Santos, Garches (FR); Romain Choiselat, Paris (FR); Sabri Arfaoui, Le Blanc-Mesnil (FR)

(73) Assignee: Societe D'Exploitation Des Procedes Marechal, Saint-Maurice (FR)

( * ) Notice: Subject to any disclaimer, the term of this patent is extended or adjusted under 35 U.S.C. 154(b) by 0 days.

(21) Appl. No.: 14/651,182

(22) PCT Filed: Nov. 19, 2013

(86) PCT No.: PCT/FR2013/052776
§ 371 (c)(1),
(2) Date: Jun. 10, 2015

(87) PCT Pub. No.: WO2014/091102
PCT Pub. Date: Jun. 19, 2014

(65) Prior Publication Data
US 2015/0333437 A1 Nov. 19, 2015

(30) Foreign Application Priority Data
Dec. 11, 2012 (FR) .................... 12 03368

(51) Int. Cl.
*H01R 13/52* (2006.01)
*F16J 15/02* (2006.01)
*F16J 15/06* (2006.01)

(52) U.S. Cl.
CPC ............... *F16J 15/025* (2013.01); *F16J 15/06* (2013.01); *H01R 13/5219* (2013.01)

(58) Field of Classification Search
CPC ............ H01R 13/5219; H01R 13/5202; H01R 13/5205; H01R 13/5221; H01R 33/965
(Continued)

(56) References Cited

U.S. PATENT DOCUMENTS

| 4,173,349 A | * | 11/1979 | Neale, III | ............. F16J 15/025 277/603 |
| 4,421,373 A | * | 12/1983 | Ratchford | .......... H01R 13/5219 439/152 |
| 2015/0011108 A1 | * | 1/2015 | Vanslambrouck | ....... H01R 4/12 439/271 |

FOREIGN PATENT DOCUMENTS

| GB | 770628 | 3/1957 |
| GB | 1141462 | 1/1969 |
| GB | 2016623 | 9/1979 |

OTHER PUBLICATIONS

The PCT Search Report mailed Dec. 11, 2012 for PCT application No. PCT/FR2013/052776, 3 pages.

* cited by examiner

*Primary Examiner* — Tho D Ta
*Assistant Examiner* — Thang Nguyen
(74) *Attorney, Agent, or Firm* — Bea Koempel-Thomas; Lee & Hayes, PLLC

(57) ABSTRACT

An annular gasket for an electrical connection of the kind comprising a socket-outlet casing (6) and a plug casing (7), said gasket extending in an axial direction (X) and comprising a cylindrical base (2) surmounted by a skirt (3) extending axially from the base (2), the skirt (3) presenting an inner wall (3*b*), an outer wall (3*a*), and a rounded free edge (4), each of the inner wall (3*b*) and of the outer wall (3*a*) presenting, a continuously curved shape in radial section view, the thickness of the skirt (3) decreasing in continuous and non-linear manner from the base (2) towards the free (Continued)

edge (4), the skirt (3) presenting a concavity oriented towards the inside of the gasket, whereby the skirt (3) folds over onto itself when axial stress is exerted on the free edge (4).

20 Claims, 3 Drawing Sheets

GASKET FOR AN ELECTRICAL CONNECTION

FIELD OF THE INVENTION

The present invention relates to a gasket for an electrical connection of the kind comprising a socket-outlet casing and a plug casing, and it also relates to such a connection having such a gasket.

STATE OF THE PRIOR ART

Electrical connections of the kind comprising a socket-outlet casing and a plug casing are well known: when the connection is established, it is necessary to provide sealing between the socket-outlet casing and the plug casing not only against liquids, and in particular water, but also against dust contained in the atmosphere.

It has been found that even though current gaskets satisfy current standards, they nevertheless tend to increase the force required for engagement. They can also be found to have little tolerance in particular with respect to:

dimensional differences of the facing elements when they are new;

variations in dimensions over time, which may lead for example to gaping and that are due in particular to stresses relaxing or to climatic variations; and the presence of greater or smaller amounts of molding flash on the join planes of the parts.

SUMMARY OF THE INVENTION

Thus, one of the objects of the present invention is to provide a gasket for an electrical connection of the kind comprising a socket-outlet casing and a plug casing, which gasket makes it possible to obviate the above drawbacks while not harming the quality of sealing, and possibly even improving it.

Another object of the invention is to provide such a gasket that makes it possible to increase the speed with which electric arcing is interrupted when uncoupling the plug casing from the socket-outlet casing.

An additional object of the invention is to provide an electrical connection of the kind comprising a socket-outlet casing and a plug casing, and that is provided with such a gasket.

These objects, and others that appear below, are achieved by an annular gasket for an electrical connection of the kind comprising a socket-outlet casing and a plug casing, said gasket extending in an axial direction and comprising a cylindrical base surmounted by a skirt extending axially from the base, the skirt presenting an inner wall, an outer wall, and a rounded free edge, each of the inner wall and of the outer wall presenting a continuously curved shape in radial section view, the thickness of the skirt decreasing in continuous and non-linear manner from the base towards the free edge, the skirt presenting a concavity oriented towards the inside of the gasket, whereby the skirt folds over onto itself when axial stress is exerted on the free edge.

It can be understood that the axial and radial directions correspond respectively to the directions defined by the Z axis and by the radius in a system of cylindrical coordinates. The axial direction is thus given by the axis of revolution of the gasket. It can also be understood that the adjectives "inner" and "outer" are used with reference to the radial direction in such a manner that an inner portion (i.e. a radially inner portion) is closer to the axis of the gasket than is an outer portion (i.e. a radially outer portion).

The configuration of the curved walls and the orientation of the concavity of the skirt enable the gasket to be particularly effective relative to preventing risks of the free edge deforming and gaping. This configuration also makes it easy to compensate for any surface defects on the socket-outlet and plug casings, e.g. molding flash. Finally, when axial stress is exerted on the free edge, e.g. when plugging together a socket-outlet casing and a plug casing, the skirt, by folding over onto itself, forms a compression spring that generates axial thrust while the casings are being disconnected, and this thrust serves to reduce the time required to interrupt the electric arcs between the electrical contacts of the casings.

In some embodiments, the outer wall of the casing presents a curve so that it extends beyond the base, and the free edge is situated inside the gasket relative to the base.

Such a curve improves the prevention of any risk of the free edge deforming and gaping, improves compensation for any surface defects of the socket-outlet and plug casings, and also improves the spring effect of the skirt.

It can thus be understood that the outer wall projects radially towards the outside of the gasket beyond the base. In other words, the outer wall presents a maximum radius that is greater than the maximum outer radius of the base. Likewise, it can be understood that the free edge presents a radius that is smaller than the minimum inner radius of the base.

In some embodiments, the skirt presents at least one rib arranged in the vicinity of the free edge.

By way of example, the rib may extend over the entire azimuth length of the free edge. It should be recalled that the azimuth direction corresponds to the direction describing an annulus around the axial direction. Thus, the azimuth direction corresponds to the direction defined by the angle in a cylindrical coordinate system.

The term "in the vicinity" is used to refer to the end portion of the skirt lying within about 20% of the axial length of the skirt from the free edge.

Such a rib serves to stiffen the free edge, thereby improving its mechanical behavior over time, and thus improving the sealing of the gasket. The rib serves in particular to improve prevention of any risk of the free edge deforming and gaping. The rib also makes it possible to improve compensation for potential surface defects of the socket-outlet and plug casings, e.g. molding flash. Finally, the rib also improves the spring effect of the gasket when connecting together the socket-outlet and plug casings, thus making it possible to increase the thrust exerted by the gasket when disconnecting the casings, and thus improve interruption of the electric arc between the electrical contacts of the casings.

In some embodiments, at least one rib is arranged on the outside of the skirt.

Such a rib also makes it possible to improve the sealing of the gasket by forming a lip that is configured to co-operate with the element co-operating with the free edge and folding the skirt over onto itself. The contact area of the gasket is thus increased, thereby improving the sealing of the gasket.

In some embodiments, at least one rib is arranged inside the skirt.

Such a rib is particularly effective in stiffening the free edge.

It should naturally be understood that the gasket may present one or more ribs arranged on the outside of the skirt, or indeed one or more ribs arranged on the inside of the skirt, or indeed one or more ribs arranged on the inside of the skirt together with one or more ribs arranged on the outside of the skirt.

In some embodiments, the base presents an axial shoulder arranged on the inside of the gasket.

It can be understood that the shoulder extends radially and presents a radial bearing surface perpendicular to the axial direction. This axial shoulder is thus configured to co-operate axially with a complementary element. For example, such a shoulder makes it easier to mount the gasket within a plug casing or a socket-outlet casing by interfitting, because it provides a bearing zone.

The present invention also provides an electrical connection of the kind comprising a socket-outlet casing and a plug casing provided with such a gasket.

Preferably, the base co-operates with the socket-outlet casing, and the rounded edge of the skirt co-operates with the cylindrical-conical wall of the plug casing, in such a manner that the skirt is folded over onto itself.

BRIEF DESCRIPTION OF THE DRAWINGS

The following description, which does not present any limiting character, should be read with reference to the accompanying figures, in which.

DETAILED DESCRIPTION OF EMBODIMENTS

Figure 1:
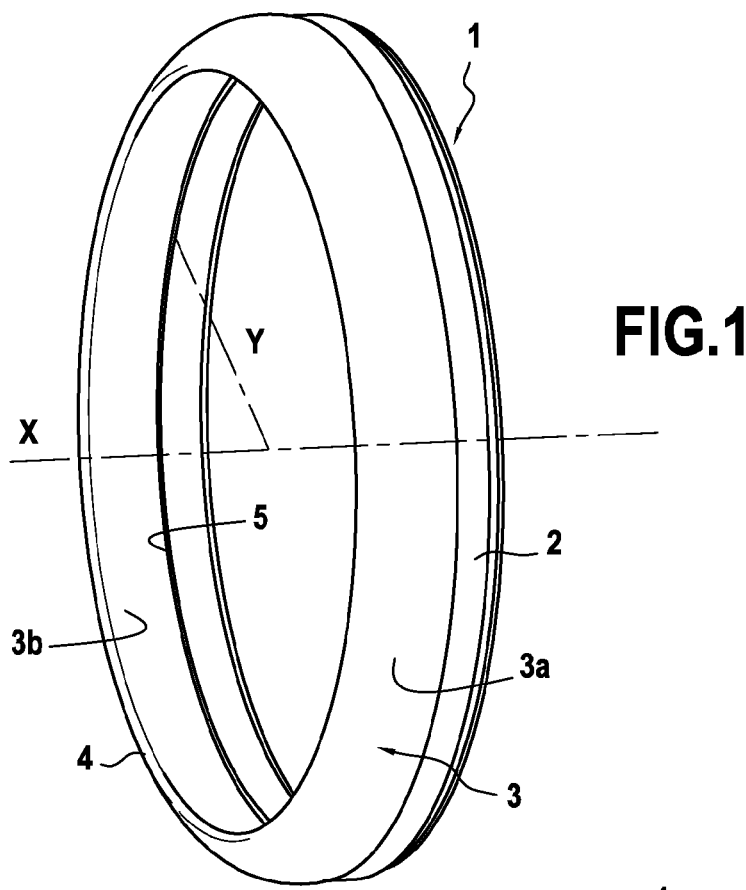
FIG. 1 is a perspective view of a first embodiment of a gasket for an electrical connection of the kind comprising a socket-outlet casing and a plug casing.
Figure 2:
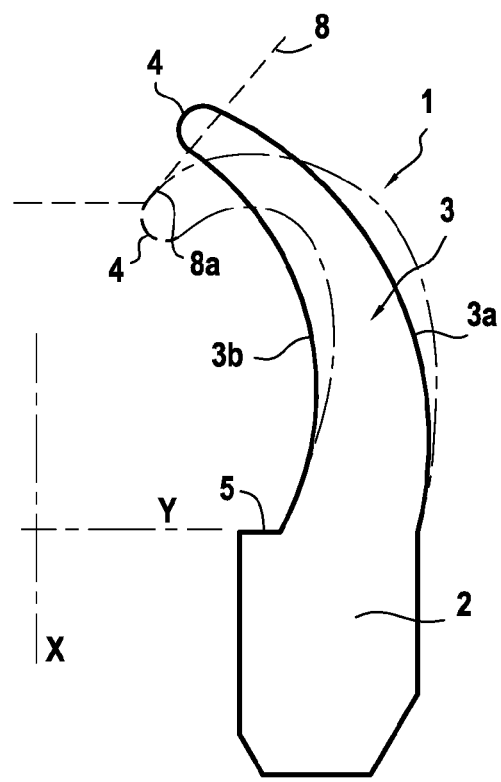
FIG. 2 is a radial half-section view of the FIG. 1 gasket, with chain-dotted lines showing the gasket when in contact with a plug casing.
Figure 3:
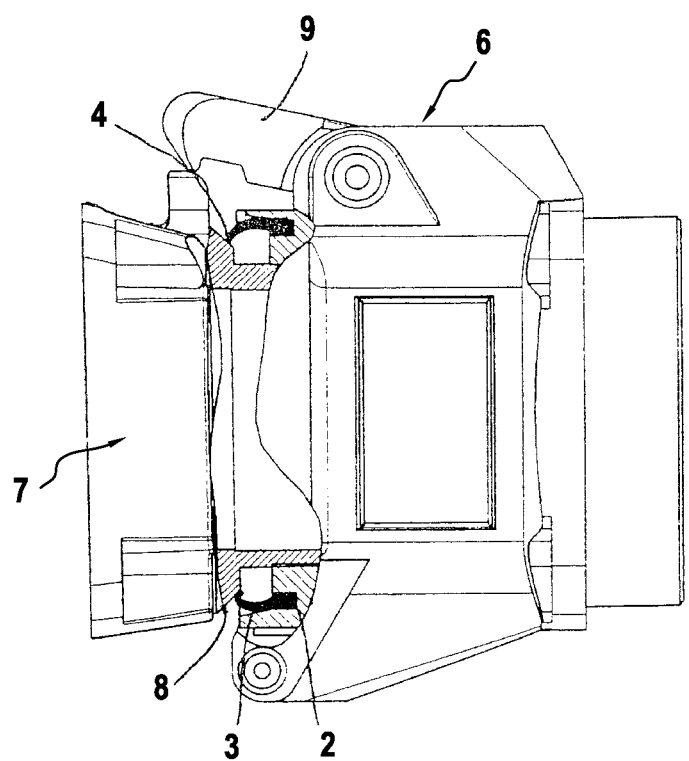
FIG. 3 is a fragmentary axial section view of an electrical connection having a gasket in a first embodiment.

As can be seen in FIGS. 1 to 3, there is shown an annular gasket given overall reference 1 for an electrical connection of the kind comprising a socket-outlet casing and a plug casing. The gasket 1 extends in an axial direction X, and in this example it is constituted by a cylindrical base 2 surmounted by a skirt 3 extending axially from the base 2 and having a free edge 4 that is rounded. The thickness of the skirt 3 decreases in non-linear and continuous manner going from the base 2 towards the rounded free edge 4. As can be seen in FIG. 2, the skirt 4 has an outer wall 3a and an inner wall 3b of shapes that are continuously curved when seen in section on a radial direction Y. The skirt 3 has a concavity oriented towards the inside. In other words, the concavity of the skirt 3 faces towards the axis X of the gasket 1.

As shown in FIG. 2 in particular, the outer wall 3a of the skirt 3 presents curvature such that it extends beyond the base 2, and the rounded edge 4 is situated on the inside of the gasket 1 relative to the base 2.

It has thus been determined that the curves for the inner wall 3b and the outer wall 3a of the skirt 3 in this first embodiment have the following respective normalized equations:

$$y=-x^3-4.5x^2+24x+0.32 \qquad (1)$$

$$y=-x^3+1.03x^2+3.01x+67.4 \qquad (2)$$

where x represents the axial distance (in millimeters) from the base 2, while y represents the radial position (in millimeters) of the inner wall (equation 1) or of the outer wall (equation 2) of the skirt 3. Naturally, these equations are non-limiting examples, and the curves for walls of variants of this gasket could satisfy other equations.

In the present embodiment, the thickness of the skirt 3 is less than the thickness of the base 2 in the vicinity of the base, so that there exists an inside shoulder 5.

Such a gasket is made of a material having greater or lesser hardness (e.g. 40 on the Shore scale), good ability to withstand high temperatures, and good resistance to external aggression, while ensuring that it has excellent flexibility.

An electrical connection of the kind comprising a socket-outlet casing 6 and a plug casing 7 is shown in FIG. 3: the plug casing 7 penetrates into the socket-outlet casing 6, which is provided with a gasket 1 as described above with reference to FIGS. 1 and 2. The plug casing 7 is held in position in the socket-outlet casing 6 by a hook 9 in conventional manner. The plug casing 7 has a cylindrical-conical wall 8 that tapers towards its free edge or cone base 8a. This cylindrical-conical wall may be cylindrical or conical with an angle at the apex that is more or less acute. In the present embodiment, this cylindrical-conical wall 8 is conical or forms a cone.

While the plug casing 7 is being advanced towards or is being introduced axially into the socket-outlet casing 6, the rounded free edge 4 of the skirt 3 becomes positioned at the cone base 8a, which then exerts axial stress on the edge 4. The axial length or height of the skirt 3 is such that it comes very soon into contact with the plug casing 7. The person skilled in the art will understand that such a gasket 1 co-operating with the cylindrical-conical wall 8 makes it possible to accommodate potential defects such as gaping in the zone remote from the zone of the hook 9.

As the plug casing 7 advances, the rounded free edge 4 of the skirt 3 folds over onto itself, with the folded portion remaining permanently in contact with the conical wall 8: this rolling up begins remote from the hook 9 and propagates towards it. The contact area between the skirt 3 and the conical wall 8 is optimized and it increases as a function of the advance of the plug casing 7 into the socket-outlet casing 6.

Because the outer wall 3a of the skirt 3 presents curvature so as to extend beyond the base 2, the skirt 3 is better able to fold over onto itself.

Furthermore, as the gasket 1 folds over progressively, the volume of folded material increases, thereby increasing engagement forces within the limit of it being possible to perform engagement manually and without using additional means (a lever, etc.), and consequently leads to an increase in the pressure exerted by the skirt 3 of the gasket 1 on the conical wall 8 of the plug casing 7.

Because of its special shape, the skirt 3 is stressed mainly in bending; the reaction exerted by the skirt 3 of the gasket 1 on the conical wall 8 of the plug casing 7 serves to provide the necessary sealing in the zone where these two elements interfere.

Because of its special shape, the skirt 3 is stressed very little in compression. The rounded edge 4 of the folded skirt 3 never interferes with the remainder of the gasket 1, and in particular with its inner wall 3b.

Because of its special shape, the skirt 3 is capable of accommodating deformation due to the various materials working over time, while remaining in contact with the conical wall 8 of the plug casing 7, even in the event of the socket-outlet casing 6 becoming spaced further away (gaping).

Furthermore, and as can be understood by the person skilled in the art, from the moment when the skirt 3 folds over onto itself, the gasket 1 tends to expand, thereby creating a barrier between the socket-outlet casing 6 and the plug casing 7. This barrier constitutes a genuine baffle suitable for guaranteeing sealing against a jet of water under pressure.

Furthermore, when the plug casing 7 is separated from the socket-outlet casing 6, the gasket 1 contributes to expelling the plug from the socket-outlet: while it is folded over, the skirt 3 acts as a spring exerting thrust that is additional to the various known forces contributing to ejecting the plug casing 7, thereby contributing to rapid interruption of the arc that is created during disconnection between the male contacts of the plug casing 7 and the female contacts of the socket-outlet casing 6.

Figure 4:
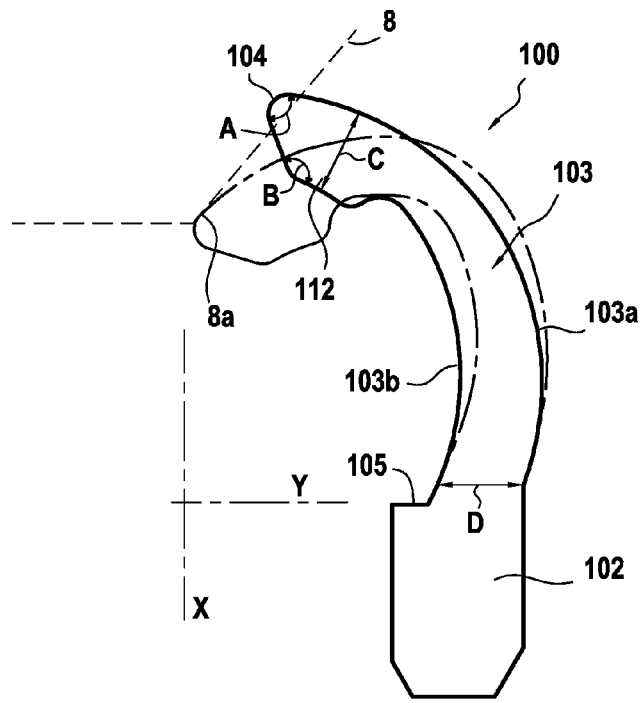
FIG. 4 is an axial half-section view of a second embodiment of the gasket, with chain-dotted lines showing the gasket when it is in contact with a plug casing.

FIG. 4 shows a gasket 100 in a second embodiment. This gasket 100 is similar to the gasket 1 of the first embodiment with the exception of an annular rib 112 located in the vicinity of the free edge 104, and with the exception of the curves for the inner and outer walls 103b and 103a of the skirt 103. Annotation A references an acute angle at the free edge 104 of the skirt 103 and annotation B, references an obtuse angle away from the free edge 104 of the skirt. Annotation C references a combined thickness of the annular rib 112 and the skirt 103 in the vicinity of the free edge 104 of the skirt and annotation D references a thickness of the skirt 103 in the vicinity of the base 102. Other elements that are common between the first embodiment and the second embodiment are not described again and they have the same reference signs plus 100. The rib 112 is an inside rib, it is arranged on the inside of the skirt 103.

Figure 5A:
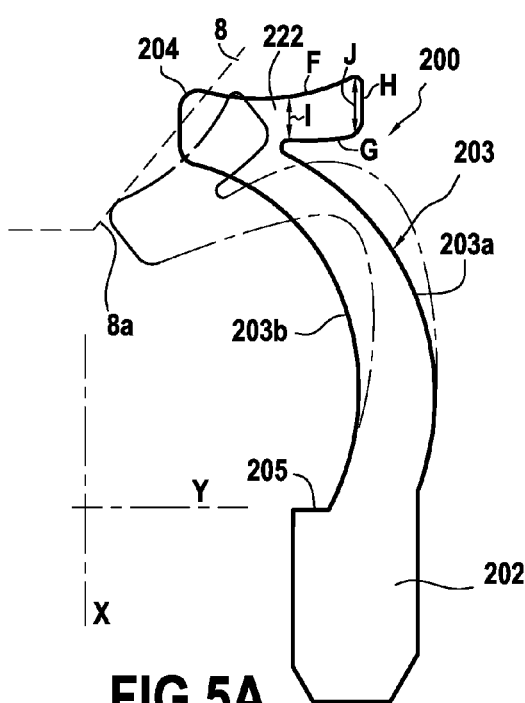
FIGS. 5A and 5B are axial half-section views of a third embodiment of the gasket, with chain-dotted lines showing the gasket when it is in contact with a plug casing.
Figure 5B:
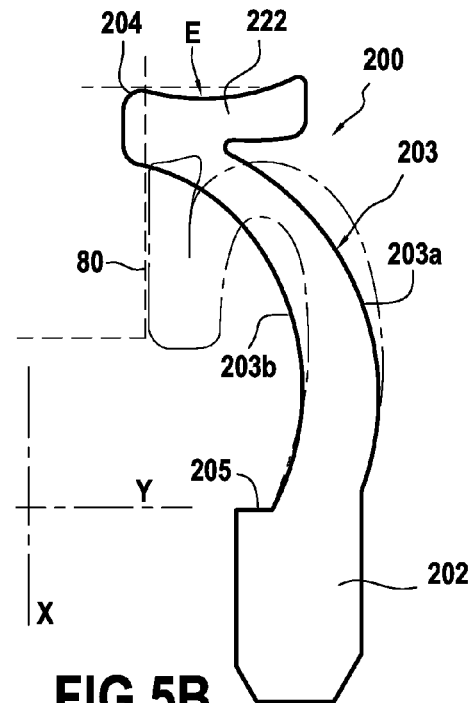

FIG. 5A shows a gasket 200 in a third embodiment. The gasket 200 is similar to the gasket 1 of the first embodiment with the exception of an annular rib 222 arranged in the vicinity of the free edge 204, and of the curves for the inner and outer walls 203b and 203a in the skirt 203. Other elements that are common between the first embodiment and the third embodiment are not described again and they retain the same reference signs, plus 200. The rib 222 is an outside rib, it is arranged on the outside of the skirt 203. Annotation F references an upper wall of annular rib 222 annotation G, references a lower wall of annular rib 222, and annotation H references a stubbed free edge of annular rib 222. Annotation I references a thickness of the annular rib 222 in the vicinity of the free edge 204 of the skirt about where the annular rib 222 contacts the outer wall of the skirt 203a, and annotation J references a thickness of the annular rib 222 in the vicinity of the stubbed free edge H. As shown in FIG. 5B, annotation E references a concavity of annular rib 222 relative to axis Y, and the concavity is oriented substantially away from the base 202. FIG. 5A shows the gasket 200 co-operating with the conical wall 8 of the plug casing 7. Furthermore, as shown in FIG. 5B, because of the rib 222, the gasket 200 is particularly well adapted to co-operate with a wall 80 that is substantially parallel to the axial direction X. Because of the rib 222, the sealing provided by the gasket is then particularly effective, the rib 222 forming an additional sealing lip. Naturally, in these embodiments also, the axial stress exerted by said wall 80 on the free edge 204 causes the skirt to fold over onto itself while rolling up, as described above.

Thus, in general terms, an outside rib makes the gasket even more versatile since it can be used with a wider variety of casing free edges.

Naturally, it is possible to envisage another variant of the gasket that presents both an inside rib and an outside rib.

Although the present invention is described with reference to specific embodiments, it is clear that modifications and changes may be made thereto without going beyond the general ambit of the invention as defined by the claims. In particular, the individual characteristics of the various embodiments shown and/or described can be combined in additional embodiments. Consequently, the description and the drawings should be considered in a sense that is illustrative rather than restrictive.

The invention claimed is:

1. An annular gasket for an electrical connection, the electrical connection comprising a socket-outlet casing and a plug casing, wherein the gasket extends in an axial direction and comprises a cylindrical base surmounted by a skirt extending axially from the base, wherein the base presents an axial shoulder arranged inside of the gasket, and the skirt presenting an inner wall, an outer wall, and a rounded free edge, each of the inner wall and of the outer wall presenting a continuously curved shape in radial section view, the thickness of the skirt decreasing in continuous and non-linear manner from the shoulder of the base towards the free edge, the skirt presenting a concavity oriented towards the inside of the gasket, whereby the skirt folds over onto itself when axial stress is exerted on the free edge.

2. The gasket according to claim 1, wherein the outer wall presents a curve such that the outer wall extends beyond the base, while the free edge is situated inside the gasket relative to the base.

3. The gasket according to claim 1, wherein the skirt presents at least one rib arranged in the vicinity of the free edge.

4. The gasket according to claim 3, wherein at least one rib is arranged on the outside of the skirt.

5. The gasket according to claim 3, wherein at least one rib is arranged inside the skirt.

6. An electrical connection comprising a socket-outlet casing and a plug casing and provided with the gasket according to claim 1.

7. The electrical connection according to claim 6, wherein the base co-operates with the socket-outlet casing while the free edge of the skirt co-operates with a cylindrical-conical wall of the plug casing in such a manner that the skirt folds over onto itself.

8. The gasket according to claim 3, wherein the free edge has an azimuth length and the rib extends over the azimuth length of the free edge.

9. The gasket according to claim 1, further comprising an annular rib inside the skirt, the annular rib inside the skirt forming at least one of:
an acute angle at the free edge of the skirt, or
an obtuse angle away from the free edge of the skirt.

10. The gasket according to claim, 1 further comprising an annular rib inside the skirt, the annular rib inside the skirt forming:
an acute angle at the free edge of the skirt, and
an obtuse angle away from the free edge of the skirt.

11. The gasket according to claim 1, further comprising an annular rib inside the skirt, the annular rib inside the skirt forming a combined thickness in the vicinity of the free edge of the skirt, wherein the combined thickness is substantially the same as the thickness of the skirt in the vicinity of the base.

12. The gasket according to claim 1, further comprising an annular rib outside the skirt at the free edge of the skirt, wherein the annular rib presents a continuously curved shape in radial section view, the annular rib oriented substantially parallel to the shoulder and substantially perpendicular to the axis of the skirt.

13. The gasket according to claim 1, further comprising an annular rib outside the skirt at the free edge of the skirt, wherein the annular rib presents a continuously curved shape in radial section view, wherein the annular rib presents a concavity oriented substantially away from the base.

14. The gasket according to claim 1, further comprising an annular rib outside the skirt at the free edge of the skirt, wherein the annular rib presents a continuously curved shape in radial section view, the continuously curved shape of the annular rib in radial section view differing from the continuously curved shape of the skirt in radial section view.

15. The gasket according to claim 1, further comprising an annular rib outside the skirt at the free edge of the skirt, wherein the annular rib presents an upper wall, a lower wall, and a stubbed free edge, each of the upper wall and of the lower wall presenting a continuously curved shape in radial section view, the thickness of the annular rib increasing in continuous and non-linear manner from the free edge of the skirt to the stubbed free edge.

16. The gasket according to claim 1, further comprising an annular rib outside the skirt at the free edge of the skirt, whereby the annular rib is configured to contact an axial stressor when the skirt folds over onto itself when axial stress is exerted on the free edge of the skirt.

17. The gasket according to claim 1, wherein the gasket is configured to decrease an amount of force required to engage the electrical connection.

18. The gasket according to claim 1, configured to improve tolerance of at least one of:
dimensional differences of the facing elements;
variations in dimensions over time; or
surface defects on the socket-outlet or plug casing.

19. The gasket according to claim 1, wherein the skirt is configured to form a compression spring arranged to generate axial thrust when the plug casing and the socket-outlet casing are disconnected.

20. The gasket according to claim 1, wherein the skirt is configured to interrupt an electrical arc when the plug casing and the socket-outlet casing are disconnected.

* * * * *